US006983039B2

(12) United States Patent
Ishikawa et al.

(10) Patent No.: US 6,983,039 B2
(45) Date of Patent: Jan. 3, 2006

(54) CALL ADMISSION CONTROL METHOD AND COMMUNICATION SYSTEM TO WHICH METHOD IS APPLIED

(75) Inventors: Yoshihiro Ishikawa, Yokosuka (JP); Akihiro Maebara, Yokohama (JP); Seizo Onoe, Yokohama (JP); Yoshitaka Hiramoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 199 days.

(21) Appl. No.: 10/453,695

(22) Filed: Jun. 4, 2003

(65) Prior Publication Data

US 2004/0009776 A1 Jan. 15, 2004

(30) Foreign Application Priority Data

Jun. 5, 2002 (JP) .................................... P2002-164815

(51) Int. Cl.
*H04M 15/00* (2006.01)

(52) U.S. Cl. ............................ 379/112.04; 379/112.01; 379/133; 379/137

(58) Field of Classification Search ............. 379/112.1, 379/112.01, 112.06, 112.08, 133–134, 137, 379/139, 221.03, 221.05, 221.07
See application file for complete search history.

(56) References Cited

U.S. PATENT DOCUMENTS

| | | | | |
|---|---|---|---|---|
| 5,570,410 A | * 10/1996 | Hooshiari | ................ | 379/32.03 |
| 5,933,481 A | * 8/1999 | MacDonald | ................ | 379/137 |
| 6,826,273 B1 | * 11/2004 | Kaplan et al. | ......... | 379/221.03 |
| 6,829,338 B2 | * 12/2004 | Gawande et al. | ........ | 379/112.1 |

FOREIGN PATENT DOCUMENTS

| | | |
|---|---|---|
| EP | 0673138 A2 | 9/1995 |
| JP | 8-191481 | 7/1996 |
| JP | 3179021 | 4/2001 |
| JP | 2002-199438 | 7/2002 |
| WO | WO98/30057 | 7/1998 |
| WO | WO 01/41376 | 6/2001 |

OTHER PUBLICATIONS

Y. Bao, et al., IEEE International Conference on Communications, vol. 1, pp. 199–203, XP–000897161, "Performance–Driven Adaptive Admission Control for Multimedia Applications", Jun. 1999.

B. Devalla, et al., Military Communications Conference, pp. 614–620, XP–010307857, "Adaptive Connection Admission Control for Mission Critical Real–Time Communication Networks", Oct. 18, 1998.

S. Goto, Protocol of IP Multicast, Mobail Computing, p. 125, IP Multicast Uses Class D Addresses, the First 4 Bits of Whose 32–Bit Length IP Address Space is "1110". Jun. 11, 1999.

* cited by examiner

*Primary Examiner*—Binh Tieu
(74) *Attorney, Agent, or Firm*—Oblon, Spivak, McClelland, Maier & Neustadt, P.C.

(57) ABSTRACT

Each communication is classified into any one of a plurality of communication types in advance. A plurality of threshold values used for determining whether or not the resources are to be allocated are set up in advance. The plurality of threshold values differ from each other according to the communication types and a predetermined number of divided traffic amount ranges such that a difference in ease of resource allocation between the communication types increases as a traffic value increases. When a communication connection request is made, the traffic of communication being executed is measured. A threshold value is selected according to the communication type of a communication associated with the connection request and the measured traffic. Whether or not resources maybe allocated to the communication associated with the connection request is determined based on the selected threshold value and the measured traffic.

7 Claims, 4 Drawing Sheets

| RANGES OF TOTAL TRAFFIC T | COMMUNICATION TYPE 0 | COMMUNICATION TYPE 1 |
|---|---|---|
| $T < T1$ | Nthr01 | Nthr11 |
| $T1 \leqq T < T2$ | Nthr02 | Nthr12 |
| $T2 \leqq T < T3$ | Nthr03 | Nthr13 |
| $T3 \leqq T < T4$ | Nthr04 | Nthr14 |
| $T \geqq T4$ | Nthr05 | Nthr15 |

| COMMUNICATION TYPE 0 | COMMUNICATION TYPE 1 |
|---|---|
| Nthr0 | Nthr1 |

CALL ADMISSION CONTROL METHOD AND COMMUNICATION SYSTEM TO WHICH METHOD IS APPLIED

CROSS REFERENCE TO RELATED APPLICATION

This application claims benefit of priority under 35 U.S.C. § 119 to Japanese Patent Application No. 2002-164815, filed on Jun. 5, 2002, the entire contents of which are incorporated by reference herein.

BACKGROUND OF THE INVENTION

1. Field of the Invention

The present invention relates to a call admission control method and a communication system to which the method is applied, and more particularly to a call admission control method and a communication system to which the method is applied in which, when resources shared by a plurality of communications are allocated to each communication, the priority levels in resource allocation differ between communication type.

2. Description of the Related Art

In general, when a request to establish a line connection is made to start communication or to establish a line with a higher communication speed in a public communication system where many subscribers use the common facilities during communication, the resources are allocated to the communication from free resources of the facilities. After the communication is finished, the allocated resources are released for use in allocating them to other communications. In this case, the call admission control function checks if resources satisfying the request are available and, if there are not enough resources satisfying the request, rejects the request to maintain the quality of communication that is being executed.

In some cases, whether or not free resources are available may be checked simply by checking whether or not a line is being used. In some other cases, for example, in a packet communication system where fluctuating traffic flows from a number of subscribers are multiplexed on a statistical basis, it is necessary to determine the acceptance of calls on a statistical basis based on the average traffic while allowing for an instantaneous fluctuation in traffic. For example, for use in a mobile communication system using a CDMA (Code Division Multiple Access) technology, which spreads user information between a wireless base station and a mobile station over a wireless spectrum that is broader compared to the transmission speed, Japanese Patent Laid-Open Publication No.Hei 8-191481 "Call Admission Control Method and Device" and WO98/30057 "Call Admission Control Method and Mobile Station Unit in CDMA Mobile Communication System" disclose a method for checking the current traffic road to determine if a new call will be accepted.

Japanese Patent Laid-Open Publication No.Hei 8-191481 discloses a method for determining the acceptance of a new call based on the predicted value of an interference amount made by a base station. The publication describes in detail that the interference amount on the uplink in a CDMA system is an observation amount corresponding to the traffic.

On the other hand, WO98/30057 discloses a method for determining the acceptance of a call in a mobile station by using information on the interference amount on the uplink or the amount of transmission power on the downlink reported by a base station. The publication describes in detail that, on a CDMA downlink, the total amount of transmission power of the base station is an observation amount corresponding to the traffic. In either case, the traffic may be identified in many communication systems in some way or other and a call admission control method based on the measured traffic is used.

Recently, in addition to the traditional voice communications, various types of services are provided in the world of communication including video phones, data transmission, or Internet connection. They differ not only in transmission speed but also in many aspects. For example, voice communications and video phones have a strict delay requirement and permit a delay of up to only several hundred milliseconds, while electronic mail permits longer delays. Therefore, it is required that calls from those services, each with its own nature, be accepted not in the same manner but in a flexible manner with the acceptability differing from service to service. In view of this, the method disclosed in U.S. Pat. No. 3,179,021 provides a plurality of determination thresholds for a plurality of service types to appropriately determine the acceptance of calls for each service type by comparing the current traffic measurement result with those thresholds.

The main object of the call admission control method described above is to reduce the call loss probability when the traffic load is heavy by making it difficult for a many-resource-requiring call to be accepted or to increase the whole communication quality by delaying communications with less-strict delay requirements while expediting communications with strict delay requirements. However, one of the problems with the conventional call admission control method described above is that the method is applied even when the traffic is low where calls may be accepted regardless of resource requirements or delay requirements. This results in that, though enough resources are available, the call loss probability of a specific communication type increases or its delay time becomes long.

SUMMARY OF THE INVENTION

In view of the foregoing, it is an object of the present invention to provide a call admission control method and a communication system to which the call admission control method is applied that prevent communication, which depends on communication types, from being performed partially when a plurality of communications of different communication types are performed while sharing the common resources.

To achieve the above object, there is provided a call admission control method for use in a communication system in which, each time a communication is performed, resources necessary for the communication are allocated from resources shared by a plurality of communications, for determining whether resources may be allocated to a communication, wherein each communication is classified into any one of a plurality of communication types and ease of resource allocation differs according to each communication type, the method comprising the steps of: measuring a traffic of resources currently allocated and shared; and increasing a difference in ease of resource allocation between the communication types as a value of the measured traffic increases.

To achieve the above object, there is provided a call admission control method for use in a communication system in which, each time a communication is performed, resources necessary for the communication are allocated from resources shared by a plurality of communications, the method comprising the steps of: classifying each communication into any one of a plurality of communication types in advance; setting up in advance a plurality of threshold values that differ from each other according to the communication types and a predetermined number of divided traffic amount ranges such that a difference in ease of resource allocation between the communication types increases as a traffic value increases, the threshold values being used for determining whether or not the resources are to be allocated; when a communication connection request is made, measuring a traffic of resources allocated and shared at that time; selecting one of the plurality of threshold values according to a communication type of a communication associated with the connection request and the measured traffic; and determining whether or not resources may be allocated to the communication associated with the connection request based on the selected threshold value and the measured traffic.

According to the present invention, a plurality of different threshold values, which are used for determining whether or not the resources are to be allocated, are set up in advance according to the communication types and a predetermined number of divided traffic amount ranges such that a difference in ease of resource allocation between the communication types increases as a traffic value increases. When a communication connection request is made, a traffic of resources allocated and shared at that time is measured. One of the plurality of threshold values is selected according to the communication type of a communication associated with the connection request and the measured traffic. Whether or not resources may be allocated to the communication associated with the connection request is determined based on the selected threshold value and the measured traffic.

To achieve the above object, there is provided a call admission control method for use in a communication system in which, each time a communication is performed, resources necessary for the communication are allocated from resources shared by a plurality of communications, the method comprising the steps of: classifying each communication into any one of a plurality of communication types in advance; when a communication connection request is made, measuring a traffic of resources allocated and shared at that time; Updating and setting up a plurality of threshold values that differ from each other according to the communication types such that a difference in ease of resource allocation between the communication types increases as the measured traffic value increases, the threshold values being used for determining whether or not the resources are to be allocated a communication associated with the connection request; selecting one of the plurality of threshold values according to a communication type of the communication associated with the connection request; and determining whether or not resources may be allocated to the communication associated with the connection request based on the selected threshold value and the measured traffic.

According to the present invention, when a communication connection request is made, a traffic of resources allocated and shared at that time is measured. A plurality of different threshold values, which are used to determine whether or not the resources are to be allocated, are updated and set up according to the communication types such that a difference in ease of resource allocation between the communication types increases as the measured traffic value increases. One of the plurality of threshold values is selected according to the communication type of the communication associated with the connection request, and whether or not resources may be allocated to the communication associated with the connection request is determined based on the selected threshold value and the measured traffic.

In a preferred embodiment of the present invention, when two communication types, communication type 0 and communication type 1, are provided, the traffic T is measured using an expression $$T=C0\times M0+C1\times M1$$

where C0 and C1 are a number of communications being executed for communication type 0 and for communication type 1 respectively and where M0 and M1 are a number of lines required for one communication of communication type 0 and for one communication of communication type 1 respectively.

To achieve the above object, there is provided a communication system in which, each time a communication is performed, resources necessary for the communication are allocated from resources shared by a plurality of communications each of which is classified into any one of a plurality of communication types in advance, the communication system comprising: a memory unit that stores therein in advance a plurality of threshold values that differ from each other according to the communication types and a predetermined number of divided traffic amount ranges such that a difference in ease of resource allocation between the communication types increases as a traffic value increases, the threshold values being used for determining whether or not the resources are to be allocated; a measurement unit that, when a communication connection request is made, measures a traffic of resources allocated and shared at that time; a call admission controller that selects one of the plurality of threshold values stored in the memory unit according to a communication type of a communication associated with the connection request and the measured traffic and determines whether or not resources may be allocated to the communication associated with the connection request based on the selected threshold value and the measured traffic.

According to the present invention, the memory unit stores therein in advance a plurality of different threshold values, which are used for determining whether or not the resources are to be allocated, according to the communication types and a predetermined number of divided traffic amount ranges such that a difference in ease of resource allocation between the communication types increases as a traffic value increases. When a communication connection request is made, the measurement unit measures a traffic of resources allocated and shared at that time. The call admission controller selects one of the plurality of threshold values stored in the memory unit according to the communication type of a communication associated with the connection request and the measured traffic and determines whether or not resources may be allocated to the communication associated with the connection request based on the selected threshold value and the measured traffic.

To achieve the above object, there is provided a communication system in which, each time a communication is performed, resources necessary for the communication are allocated from resources shared by a plurality of communications each of which is classified into any one of a plurality of communication types in advance, the communication system comprising: a measurement unit that, when a communication connection request is made, measures a traffic of resources allocated and shared at that time; a memory unit in which a plurality of threshold values that differ from each other according to the communication types are updated and set up such that a difference in ease of resource allocation between the communication types increases as the measured traffic value increases, the threshold values being used for determining whether or not the resources are to be allocated to a communication associated with the connection request; and a call admission controller that selects one of the plurality of threshold values stored in said memory unit according to a communication type of the communication associated with the connection request and determines whether or not resources may be allocated to the communication associated with the connection request based on the selected threshold value and the measured traffic.

According to the present invention, when a communication connection request is made, the measurement unit measures a traffic of resources allocated and shared at that time. The memory unit stores therein a plurality of threshold values used for determining whether or not the resources are to be allocated to the communication associated with the connection request. Those threshold values, which differ from each other according to the communication types, are updated and set up in the memory unit such that a difference in ease of resource allocation between the communication types increases as the measured traffic value increases. The call admission controller selects one of the plurality of threshold values according to the communication type of the communication associated with the connection request and determines whether or not resources may be allocated to the communication associated with the connection request based on the selected threshold value and the measured traffic.

In a preferred embodiment of the present invention, when two communication types, communication type 0 and communication type 1, are provided, the measurement unit measures the traffic T using an expression $$T=C0\times M0+C1\times M1$$

where C0 and C1 are a number of communications being executed for communication type 0 and for communication type 1 respectively and where M0 and M1 are a number of lines required for one communication of communication type 0 and for one communication of communication type 1 respectively.

The nature, principle and utility of the invention will become more apparent from the following detailed description when read in conjunction with the accompanying drawings.

DESCRIPTION OF THE PREFERRED EMBODIMENTS

An embodiment of a call admission control method according to the present invention and a communication system to which the method is applied will be described below with reference to the drawings.

Figures 1, 2:
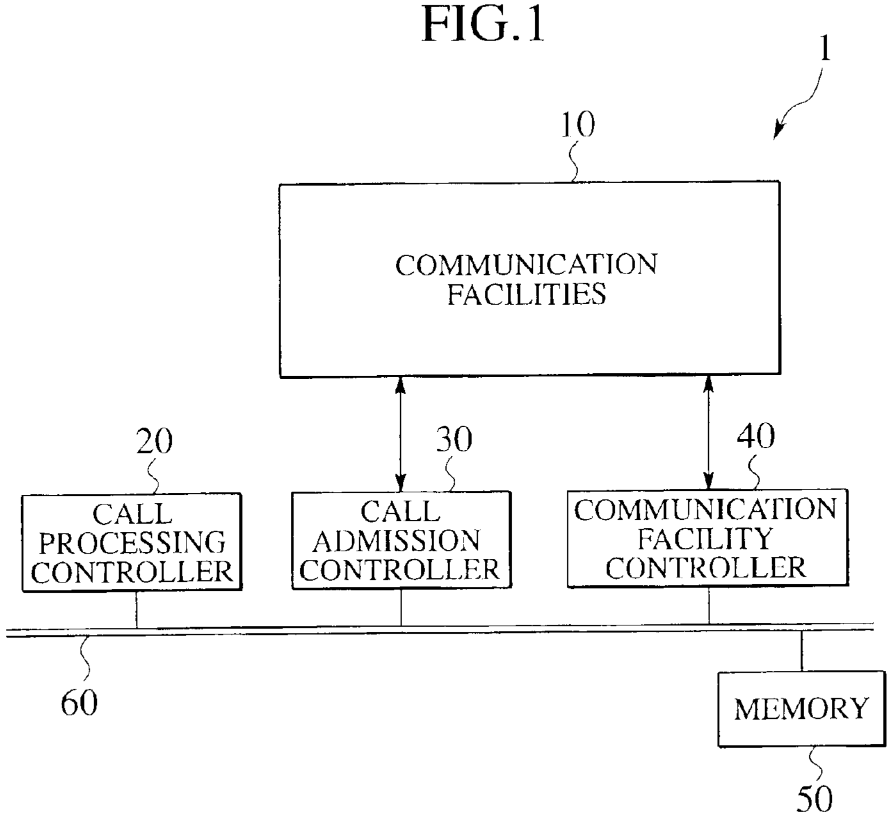
FIG. 1 is a diagram showing the configuration of an embodiment of a communication system in which a call admission control method according to the present invention is implemented.
FIG. 2 is a diagram showing an example of threshold values which are stored in a memory, which correspond to communication types and a total traffic T, and which are used to determine whether or not a call is to be accepted.

FIG. 1 is a diagram showing the configuration of one embodiment of a communication system in which a call admission control method according to present invention is implemented.

Referring to FIG. 1, a communication system 1 comprises communication facilities 10, a call processing controller 20, a call admission controller 30, a communication facility controller 40, a memory 50, and a bus 60. The communication facilities 10 are shared by a plurality of communications. The call processing controller 20 manages the establishment or release of a call and instructs the communication facility controller 40 to allocate or release the communication facilities 10. The call admission controller 30 reads information from the memory 50 as necessary to check whether or not a call is to be accepted. In response to an instruction from the call processing controller 20, the communication facility controller 40 allocates or releases the communication facilities 10. The call processing controller 20, call admission controller 30, communication facility controller 40, and memory 50 are interconnected via the bus 60 for communication.

FIG. 2 is a diagram showing an example of thresholds stored in the memory 50. Those thresholds, provided for the communication types and the ranges of the total traffic T, are used to determine whether or not a call is to be accepted. For example, if communication type 0 has a higher transmission speed and/or a smaller delay tolerance than that of communication type 1, the relation of thresholds is $Nthr0i<Nthr1i$ ($\forall i$, i=1 to 5). That is, a call classified into communication type 1 is made easier to be accepted. In addition, the present invention is characterized in the relation (Nthr01/Nthr11)>(Nthr02/Nthr12)>(Nthr03/Nthr13)>(Nthr04/Nthr14)>(Nthr05/Nthr15). That is, as the measured total traffic T becomes higher, the call acceptability of communication type 0 is made lower in relation to that of communication type 1. In other words, as the measured total traffic T becomes lower, the difference between the call acceptability of communication type 0 and that of communication type 1 becomes smaller. This relieves the problem that, when the measured total traffic T is low, communications belonging to communication type 0, that is, communications requiring high-speed transmission speed and/or small delay tolerance, are not accepted excessively.

In FIG. 2, because there are two communication types, 0 and 1, and the total traffic T is divided into five ranges, a total of 10 thresholds are provided. For example, when the system determines whether to accept a call of communication type 0 when the measurement result of the total traffic T is equal to or higher than T2 but lower than T3, the threshold value of Nthr03 is read.

Although there are two communication types, 0 and 1, and the total traffic T is divided into five ranges in this embodiment, the number of communication types and the number of ranges are not limited to those numbers.

Figure 3:
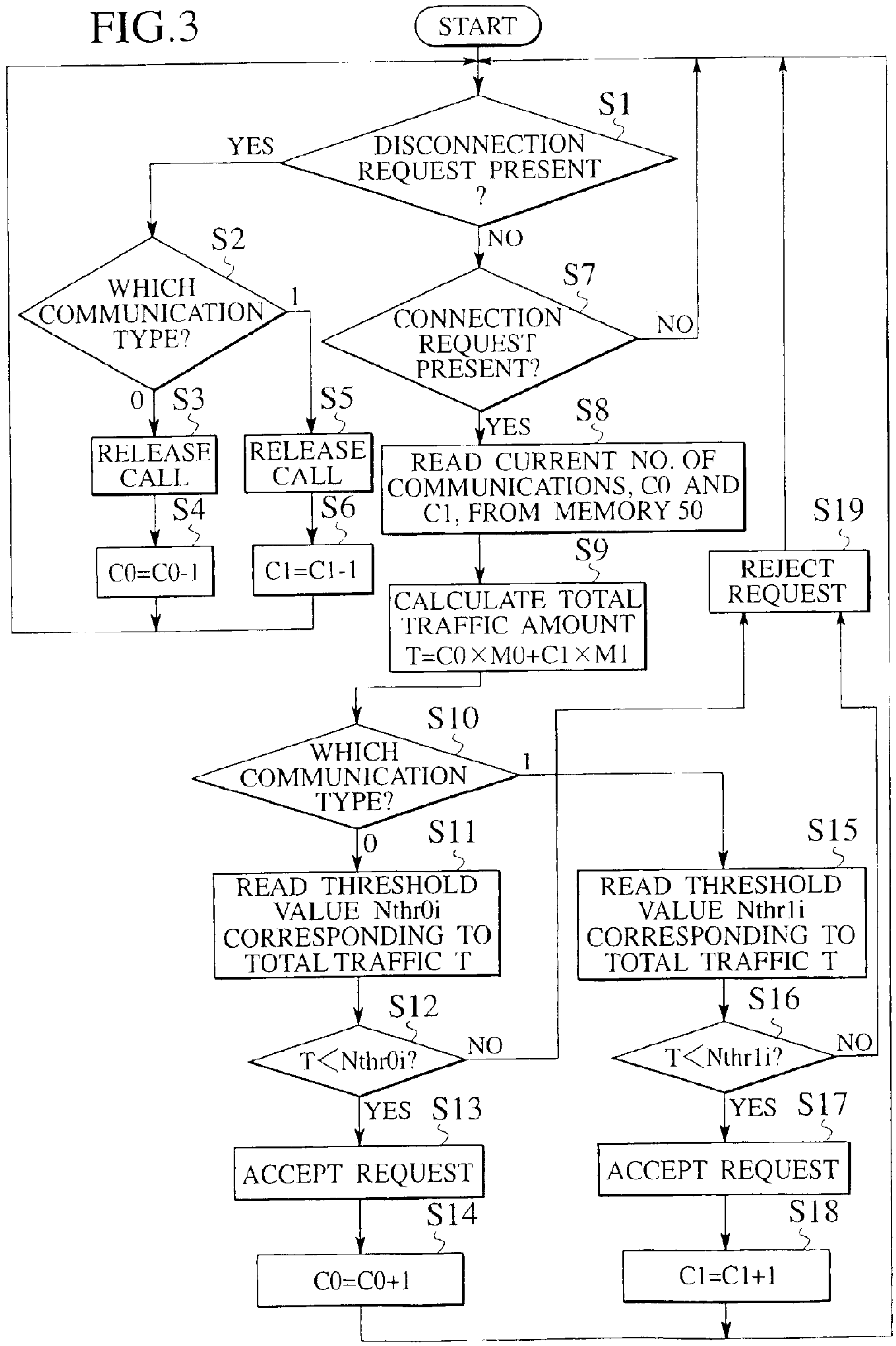
FIG. 3 is a flowchart showing the processing procedure of one embodiment of the call admission control method according to the present invention.

FIG. 3 is a flowchart showing the processing procedure for one embodiment of the call admission control method according to the present invention.

In this embodiment, there are two communication types, 0 and 1, corresponding to those in FIG. 2. In this example, one communication of communication type 0 and communication type 1 requires M0 lines and M1 lines, respectively. The total number of lines in use is used as the total traffic value and, if this value is lower than the threshold, the system determines that the call may be accepted. Most typically, the total number of lines in use is used as the total traffic value; however, as with the number of communication types, some other value may also be used as the total traffic value. Neither is the determination method limited to the comparison between the total traffic and the threshold value; some other determination method may also be used.

The following describes the processing procedure with reference to FIG. 3.

First, the call processing controller 20 shown in FIG. 1 checks if a request to disconnect communication is present (step 1). If a request to disconnect communication is present (Yes), control is passed to step 2. If a request to disconnect communication is not present (No), control is passed to step 7.

In step 2, the call processing controller 20 checks the communication type of communication to be disconnected. If the communication type is 0, the call processing controller 20 releases the call of the communication (step 3), decrements variable C0 by 1 (step 4), and passes control back to step 1. On the other hand, if the communication type is 1, the call processing controller 20 releases the call of the communication (step 5), decrements variable C1 by 1 (step 6), and passes control back to step 1. Variables C0 and C1, each of which contains the number of active communications of communication type 0 and communication type 1 respectively, are stored in the memory 50 in FIG. 1.

In step 7, the call admission controller 30 checks if a connection request is present. If a connection request is not present (No), control is passed back to step 1. On the other hand, if a connection request is present, the call admission controller 30 reads variables C0 and C1, in which the number of active communications of communication type 0 and communication type 1 are stored, from the memory 50 (step 8) and calculates the current total traffic T using the expression $T=C0\times M0+C1\times M1$ (step 9). Then, the call admission controller 30 checks the communication type of the communication associated with the connection request.

If it is found as the result of step 10 that the communication type is 0, the call admission controller 30 reads the threshold value Nthr0i from the memory 50 (step 11). This threshold value corresponds to communication type 0 and to the total traffic T calculated in step 9. Then, the call admission controller 30 checks if the calculated total traffic T is lower than the threshold value Nthr0i that has been read (T<Nthr0i) (step 12). If the total traffic T is equal to or higher than the threshold value Nthr0i (No), the call admission controller 30 rejects the acceptance of the connection request (step 19) and passes control back to step 1. On the other hand, if the total traffic T is lower than the threshold value Nthr0i (Yes), the call admission controller 30 performs acceptance processing for the connection request (step 13), increments variable C0 by 1 (step 14), and passes control back to step 1.

If it is found as the result of step 10 that the communication type is 1, the call admission controller 30 reads the threshold value Nthr1i from the memory 50 (step 15). This threshold value corresponds to communication type 1 and to the total traffic T calculated in step 9. Then, the call admission controller 30 checks if the calculated total traffic T is lower than the threshold value Nthr1i that has been read (T<Nthr1i) (step 16). If the total traffic T is equal to or higher than the threshold value Nthr1i (No), the call admission controller 30 rejects the acceptance of the connection request (step 19) and passes control back to step 1. On the other hand, if the total traffic T is lower than the threshold value Nthr1i (Yes), the call admission controller 30 performs acceptance processing for the connection request (step 17), increments variable C1 by 1 (step 18), and passes control back to step 1.

After that, the call processing controller 20 manages the establishment or releases of the call according to the processing result of the call admission controller 30 and instructs the communication facility controller 40 to allocate or release the communication facilities 10. In response to the instruction from the call processing controller 20, the communication facility controller 40 allocates or releases the communication facilities 10.

(Modification)

Figures 4, 5:
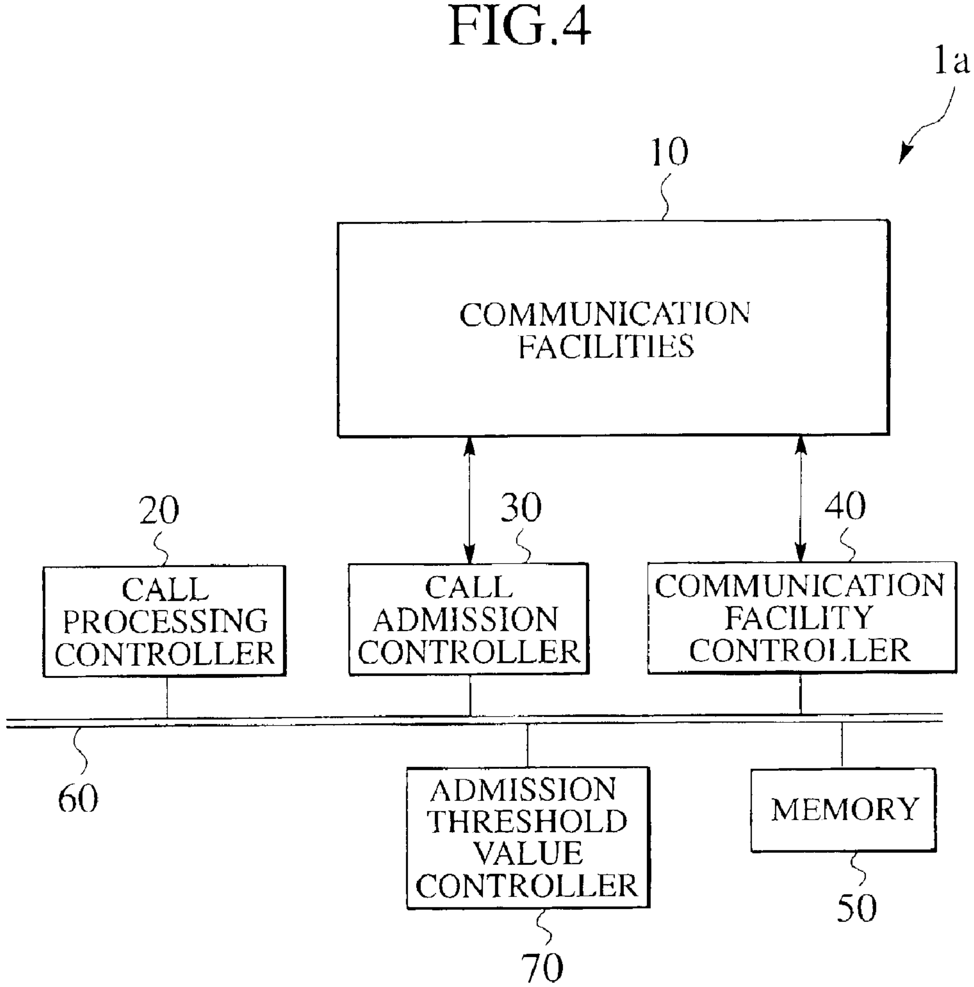
FIG. 4 is a diagram showing the configuration of a modification of one embodiment of the communication system in which the call admission control method according to the present invention is implemented.
FIG. 5 is a diagram showing an example of threshold values which correspond to the modification shown in FIG. 4 and which are stored in the memory.
Figure 6:
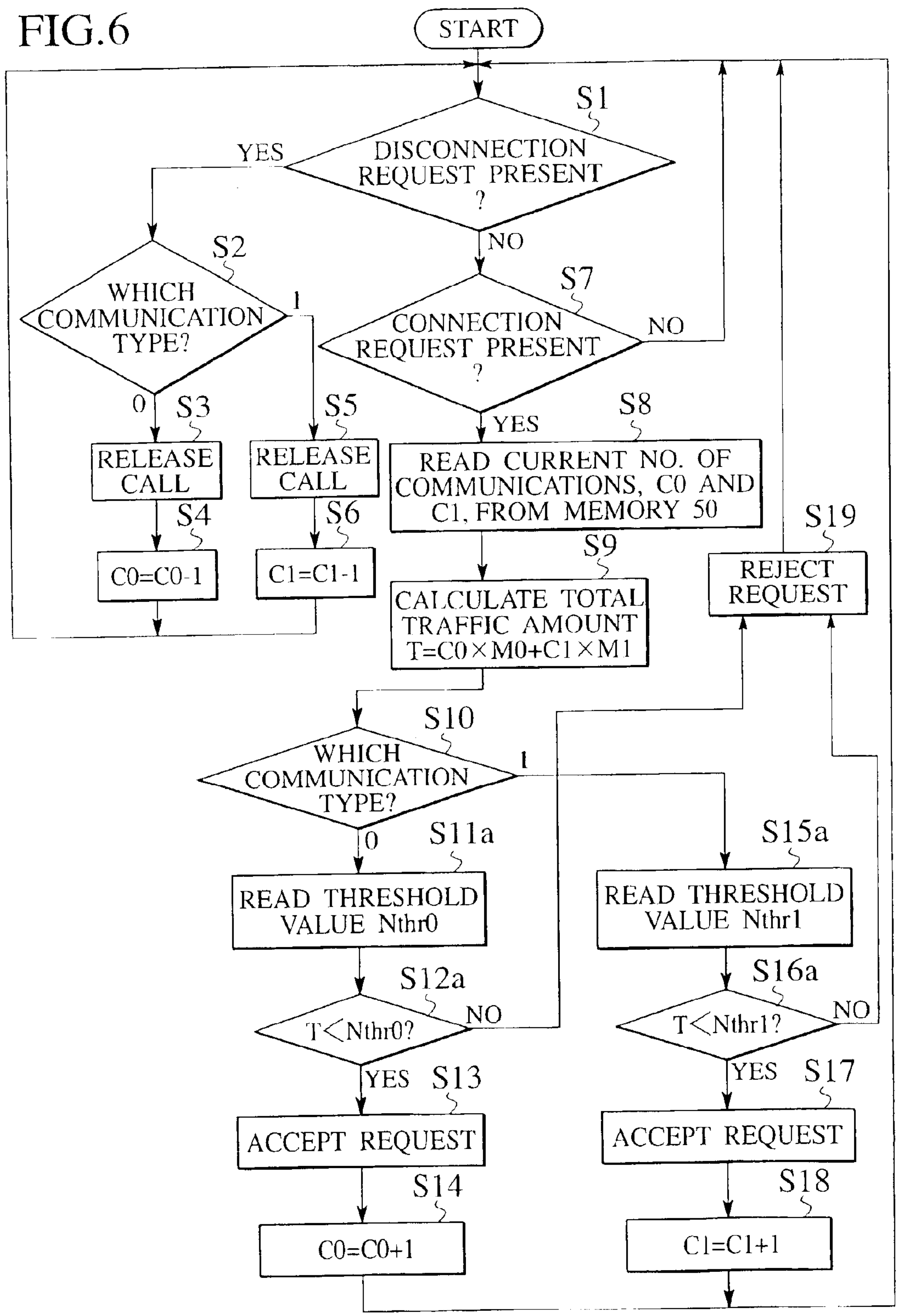
FIG. 6 is a flowchart showing the processing procedure corresponding to the modification shown in FIG. 4.

FIG. 4 is a diagram showing the configuration of a modification of one embodiment of a communication system in which the call admission control method according to the present invention is implemented. FIG. 5 is a diagram showing an example of threshold values corresponding to the modification in FIG. 4 and stored in the memory 50. FIG. 6 is a flowchart showing the processing procedure corresponding to the modification shown in FIG. 4.

In this modification, only two areas, in which the threshold values corresponding to two communication types are stored, are allocated in the memory 50 as shown in FIG. 5, as in the conventional system. On the other hand, a communication system 1*a* in this modification has the configuration as shown in FIG. 4, in which an admission threshold value controller 70 is added to the communication system 1.

In this modification, the admission threshold value controller 70 performs the processing of step 8 and step 9. That is, the admission threshold value controller 70 reads variables C0 and C1, each of which contains the number of active communications of communication type 0 and communication type 1 respectively, from the memory 50 (step 8) and calculates the current total traffic T based on the expression $T=C0\times M0+C1\times M1$ (step 9). The admission threshold value controller 70 stores the threshold values Nthr0 and Nthr1, corresponding to the calculated total traffic T, in the memory 50. Then, the call admission controller 30 checks the communication type of communication of the connection request (step 10).

If it is found as the result of step 10 that the communication type is 0, the call admission controller 30 reads the threshold value Nthr0 corresponding communication type 0 from the memory 50 (step 11*a*). Then, the call admission controller 30 checks if the total traffic T is lower than the threshold value Nthr0 that has been read (T<Nthr0) (step 12*a*).

If it is found as the result of step 10 that the communication type is 1, the call admission controller 30 reads the threshold value Nthr1 corresponding communication type 1 from the memory 50 (step 15*a*). Then, the call admission controller 30 checks if the total traffic T is lower than the threshold value Nthr1 that has been read (T<Nthr1) (step 16*a*).

The other processing steps are the same as those in the processing procedure shown in FIG. 3. This modification has the advantage of saving the area in the memory 50.

As described above, according to the present invention, in communications in which the priority levels in resource allocation are varied depending on a communication type upon allocating the resources required for each communication from those shared by a plurality of communications, this system impartially allocates resources regardless of communication types while ensuring efficient resource usage.

There are following two modes realizing a system in which the difference in ease of resource allocation between communication types is increased as the measured traffic value increases.

In first mode, a plurality of threshold values used for determining whether or not the resources are to be allocated are set up in advance. The plurality of threshold values differ from each other according to the communication types and a predetermined number of divided traffic amount ranges such that a difference in ease of resource allocation between the communication types increases as a traffic value increases. Whether or not to allocate resources to a communication associated with a connection request is determined based on a selected threshold value and a measured traffic. As compared with a second mode that will be described below, the contents of the memory need not to be re-written.

In the second mode, the traffic of resources allocated and shared when a communication connection request is made is measured. A plurality of threshold values that are used for determining whether or not the resources are to be allocated to a communication associated with the connection request and that differ from each other according to the communication types are updated and set up such that a difference in ease of resource allocation between the communication types increases as the measured traffic value increases. Whether or not to allocate resources to the communication of the connection request is determined based on a selected threshold value and a measured traffic. As compared with the first mode described above, this mode saves the memory area.

It should be understood that many modifications and adaptations of the invention will become apparent to those skilled in the art and it is intended to encompass such obvious modifications and changes in the scope of the claims appended hereto.

What is claimed is:

1. For use in a communication system in which, each time a communication is performed, resources necessary for the communication are allocated from resources shared by a plurality of communications, a call admission control method for determining whether resources may be allocated to a communication, wherein each communication is classified into any one of a plurality of communication types and ease of resource allocation differs according to each communication type, said method comprising the steps of:

measuring a traffic of resources currently allocated and shared; and increasing a difference in ease of resource allocation between the communication types as a value of the measured traffic increases.

2. A call admission control method for use in a communication system in which, each time a communication is performed, resources necessary for the communication are allocated from resources shared by a plurality of communications, said method comprising the steps of:

classifying each communication into any one of a plurality of communication types in advance;

setting up in advance a plurality of threshold values that differ from each other according to the communication types and a predetermined number of divided traffic amount ranges such that a difference in ease of resource allocation between the communication types increases as a traffic value increases, said threshold values being used for determining whether or not the resources are to be allocated;

when a communication connection request is made, measuring a traffic of resources allocated and shared at that time;

selecting one of the plurality of threshold values according to a communication type of a communication associated with the connection request and the measured traffic; and determining whether or not resources may be allocated to the communication associated with the connection request based on the selected threshold value and the measured traffic.

3. A call admission control method for use in a communication system in which, each time a communication is performed, resources necessary for the communication are allocated from resources shared by a plurality of communications, said method comprising the steps of:

classifying each communication into any one of a plurality of communication types in advance;

when a communication connection request is made, measuring a traffic of resources allocated and shared at that time;

updating and setting up a plurality of threshold values that differ from each other according to the communication types such that a difference in ease of resource allocation between the communication types increases as the measured traffic value increases, said threshold values being used for determining whether or not the resources are to be allocated to a communication associated with the connection request;

selecting one of the plurality of threshold values according to a communication type of the communication associated with the connection request; and determining whether or not resources may be allocated to the communication associated with the connection request based on the selected threshold value and the measured traffic.

4. A communication system in which, each time a communication is performed, resources necessary for the communication are allocated from resources shared by a plurality of communications each of which is classified into any one of a plurality of communication types in advance, said communication system comprising:

a memory unit that stores therein in advance a plurality of threshold values that differ from each other according to the communication types and a predetermined number of divided traffic amount ranges such that a difference in ease of resource allocation between the communication types increases as a traffic value increases, said threshold values being used for determining whether or not the resources are to be allocated;

a measurement unit that, when a communication connection request is made, measures a traffic of resources allocated and shared at that time;

a call admission controller that selects one of the plurality of threshold values stored in said memory unit according to a communication type of a communication associated with the connection request and the measured traffic and determines whether or not resources may be allocated to the communication associated with the connection request based on the selected threshold value and the measured traffic.

5. The communication system according to claim 4 wherein, when two communication types, communication type 0 and communication type 1, are provided, said measurement unit measures the traffic T using an expression $$T=C0\times M0+C1\times M1$$

where C0 and C1 are a number of communications being executed for communication type 0 and for communication type 1 respectively and where M0 and M1 are a number of lines required for one communication of communication type 0 and for one communication of communication type 1 respectively.

6. A communication system in which, each time a communication is performed, resources necessary for the communication are allocated from resources shared by a plurality of communications each of which is classified into any one of a plurality of communication types in advance, said communication system comprising:

a measurement unit that, when a communication connection request is made, measures a traffic of resources allocated and shared at that time;

a memory unit in which a plurality of threshold values that differ from each other according to the communication types are updated and set up such that a difference in ease of resource allocation between the communication types increases as the measured traffic value increases, said threshold values being used for determining whether or not the resources are to be allocated to a communication associated with the connection request; and a call admission controller that selects one of the plurality of threshold values stored in said memory unit according to a communication type of the communication associated with the connection request and determines whether or not resources may be allocated to the communication associated with the connection request based on the selected threshold value and the measured traffic.

7. The communication system according to claim 6 wherein, when two communication types, communication type 0 and communication type 1, are provided, said measurement unit measures the traffic T using an expression $$T=C0\times M0+C1\times M1$$

where C0 and C1 are a number of communications being executed for communication type 0 and for communication type 1 respectively and where M0 and M1 are a number of lines required for one communication of communication type 0 and for one communication of communication type 1 respectively.

* * * * *